United States Patent
Kuan et al.

(10) Patent No.: US 9,899,920 B2
(45) Date of Patent: Feb. 20, 2018

(54) VOLTAGE REGULATOR AND METHOD FOR CONTROLLING OUTPUT STAGES OF VOLTAGE REGULATOR

(71) Applicant: MEDIATEK INC., Hsin-Chu (TW)

(72) Inventors: Chien-Wei Kuan, Hsinchu County (TW); Yen-Hsun Hsu, Hsinchu County (TW); Shan-Fong Hong, Taipei (TW); Chih-Chen Li, Taichung (TW); Yu-Te Chao, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/172,120

(22) Filed: Jun. 2, 2016

(65) Prior Publication Data
US 2017/0077811 A1    Mar. 16, 2017

Related U.S. Application Data

(60) Provisional application No. 62/217,174, filed on Sep. 11, 2015.

(51) Int. Cl.
*G05F 1/00* (2006.01)
*G05F 1/573* (2006.01)
(Continued)

(52) U.S. Cl.
CPC ............. *H02M 3/158* (2013.01); *H02M 1/08* (2013.01); *H02M 1/14* (2013.01); *H02M 3/1584* (2013.01); *H02M 2001/0009* (2013.01); *H02M 2001/0032* (2013.01); *H02M 2001/0048* (2013.01); *H02M 2003/1586* (2013.01); *Y02B 70/1491* (2013.01); *Y02B 70/16* (2013.01)

(58) Field of Classification Search
CPC ............... H02M 1/084; H02M 1/0845; H02M 2001/0077; H02M 2003/1586
USPC ....... 323/266, 268, 269, 271, 272, 274–277, 323/282–285
See application file for complete search history.

(56) References Cited

U.S. PATENT DOCUMENTS 6,943,535 B1 *   9/2005   Schiff .................. H02M 3/1584
                                                    323/244
8,098,505 B1    1/2012    Choi
(Continued)

FOREIGN PATENT DOCUMENTS

WO       2015106686 A1    7/2015

*Primary Examiner* — Gary Nash
(74) *Attorney, Agent, or Firm* — Winston Hsu

(57) ABSTRACT

A voltage regulator includes a plurality of output stages and a controller. The plurality of output stages are arranged for selectively enabling to generate output voltages and output currents or not according to a plurality of control signals, respectively. The controller is arranged for sensing the output currents of the output stages, and generating the control signals according to the sensed output currents. When the controller generates the control signals to reduce a quantity of the enabled output stages, the controller determines whether a summation of the sensed output currents is greater than a first threshold or not to determine whether to enable more output stages, then a period of time later, the controller selectively determines whether the summation of the sensed output currents is greater than a second threshold or not to determine whether to enable more output stages, wherein the second threshold is lower than the first threshold.

31 Claims, 7 Drawing Sheets

(51) Int. Cl.
*H02M 3/158* (2006.01)
*H02M 1/14* (2006.01)
*H02M 1/08* (2006.01)
*H02M 1/00* (2006.01)

(56) References Cited

U.S. PATENT DOCUMENTS

| | | |
|---|---|---|
| 8,836,298 B1 | 9/2014 | Chen |
| 2007/0013350 A1 | 1/2007 | Tang et al. |
| 2009/0267578 A1* | 10/2009 | Luo ......................... H02J 1/102 323/272 |
| 2011/0080151 A1* | 4/2011 | Rahardjo ............ H02M 3/1584 323/285 |
| 2011/0110134 A1 | 5/2011 | Gaboury |
| 2012/0262136 A1* | 10/2012 | Nien .................. H02M 3/1584 323/272 |
| 2014/0197810 A1* | 7/2014 | Huang .................... G05F 1/468 323/272 |

* cited by examiner

VOLTAGE REGULATOR AND METHOD FOR CONTROLLING OUTPUT STAGES OF VOLTAGE REGULATOR

CROSS REFERENCE TO RELATED APPLICATIONS

This application claims the priority of U.S. Provisional Application No. 62/217,174, filed on Sep. 11, 2015, which is included herein by reference in its entirety.

BACKGROUND

In order to have better power efficiency, the conventional DC-DC voltage regulator is controlled to provide an output voltage with one or more phases according to a loading. In detail, when the DC-DC voltage regulator provides the output voltage to a light load (i.e. less load current), the DC-DC voltage regulator may provide the output voltage with a single phase; on the other hand, when the DC-DC voltage regulator provides the output voltage to a heavy load (i.e. large load current), the DC-DC voltage regulator may provide the output voltage with two or more phases. However, when the load current decreases and the DC-DC voltage regulator switches from a dual phase mode to a single phase mode, an overshoot issue may occur on the load current, and the DC-DC voltage regulator may misunderstand that load becomes heavy, thereby the DC-DC voltage regulator immediately switches back to the dual phase mode. In light of above, a toggle between the dual phase mode and the single phase mode will always occur, and the power efficiency may be worsened.

SUMMARY

It is therefore an objective of the present invention to provide a voltage regulator, which has a buffer band to prevent the voltage regulator from toggling between the dual phase mode and the single phase mode, to solve the above-mentioned problem.

According to one embodiment of the present invention, a voltage regulator comprises a plurality of output stages and a controller. The plurality of output stages are arranged for selectively enabling to generate output voltages and output currents or not according to a plurality of control signals, respectively. The controller is arranged for sensing the output currents of the output stages, and generating the control signals to control the output stages, respectively, according to the sensed output currents. In addition, when the controller generates the control signals to reduce a quantity of the enabled output stages, the controller determines whether a summation of the sensed output currents is greater than a first threshold or not to determine whether to enable more output stages, then a period of time later, the controller selectively determines whether the summation of the sensed output currents is greater than a second threshold or not to determine whether to enable more output stages, wherein the second threshold is lower than the first threshold.

According to another embodiment of the present invention, a method for controlling a plurality of output stages of a voltage regulator comprises: sensing output currents of the output stages; generating a plurality of control signals to selectively enable the output stages or not, respectively, according to the sensed output currents; when the output stages are controlled to reduce a quantity of the enabled output stages, determining whether a summation of the sensed output currents is greater than a first threshold or not to determine whether to enable more output stages; then a period of time later, selectively determining whether the summation of the sensed output currents is greater than a second threshold or not to determine whether to enable more output stages, wherein the second threshold is lower than the first threshold.

According to another embodiment of the present invention, a voltage regulator comprises a first output stage, a second output stage and a controller. The first output stage is arranged for selectively enabling to generate a first output voltage and a first output current with a first phase or not. The second output stage is arranged for selectively enabling to generate a second output voltage and a second output current with a second phase or not. The controller is arranged for selectively operating in a single phase mode or a dual phase mode according to the first output current and the second output current, wherein when the controller operates in the single phase mode, the controller enables the first output stage and disable the second output stage; and when the controller operates in the dual phase mode, the controller enables the first output stage and the second output stage. In addition, when the controller switches from the dual phase mode to the single phase mode, the controller determines whether the first output current is greater than a first threshold or not to determine whether to switchback to the dual phase mode, then a period of time later, the controller selectively determines whether the first output current is greater than a second threshold or not to determine whether to switch back to the dual phase mode, wherein the second threshold is lower than the first threshold.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
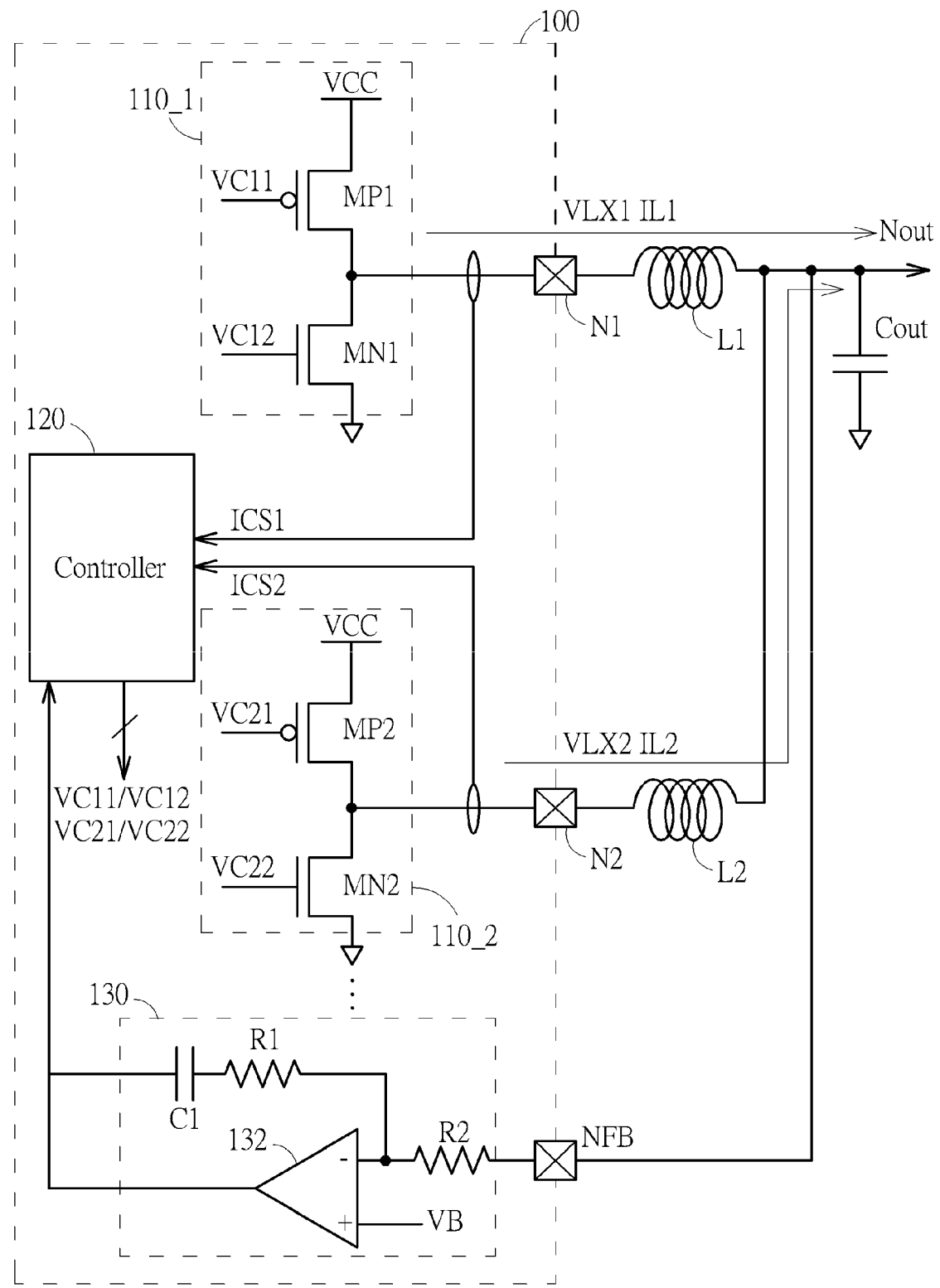
FIG. 1 is a diagram illustrating a voltage regulator according to one embodiment of the present invention.

Please refer to FIG. 1, which is a diagram illustrating a voltage regulator 100 according to one embodiment of the present invention. As shown in FIG. 1, the voltage regulator 100 comprises a plurality of output stages (in this embodiment, there are two output stages 110_1 and 110_2), a controller 120 and a voltage compensation circuit 130. In this embodiment, the output stage 110_1 is supplied by a supply voltage VCC, and the output stage 110_1 comprises a PMOS MP1 and an NMOS MN1; the output stage 110_2 is supplied by the supply voltage VCC, and the output stage 110_2 comprises a PMOS MP2 and an NMOS MN2; and the voltage compensation circuit 130 comprises an operational amplifier 132, a capacitor C1 and two resistors R1 and R2, where the operational amplifier 132 is arranged to provide a compensation signal to the controller 120 according to a feedback voltage and a bias voltage VB. In addition, the voltage regulator 100 is a DC-DC voltage regulator, and is arranged to provide a required DC voltage at an output node Nout according to the supply voltage VCC.

The voltage regulator 100 may be positioned in a chip, and the chip comprises a plurality of pads (e.g. N1, N2, NFB shown in FIG. 1), and the output stage 110_1 provides an output voltage VLX1 and an output current IL1 to the output node Nout via the pad N1 and an inductor L1, and the output stage 110_2 provides an output voltage VLX2 and an output current IL2 to the output node Nout via the pad N2 and an inductor L2. In addition, the capacitor Cout at the output node Nout represents a load.

Figure 2:
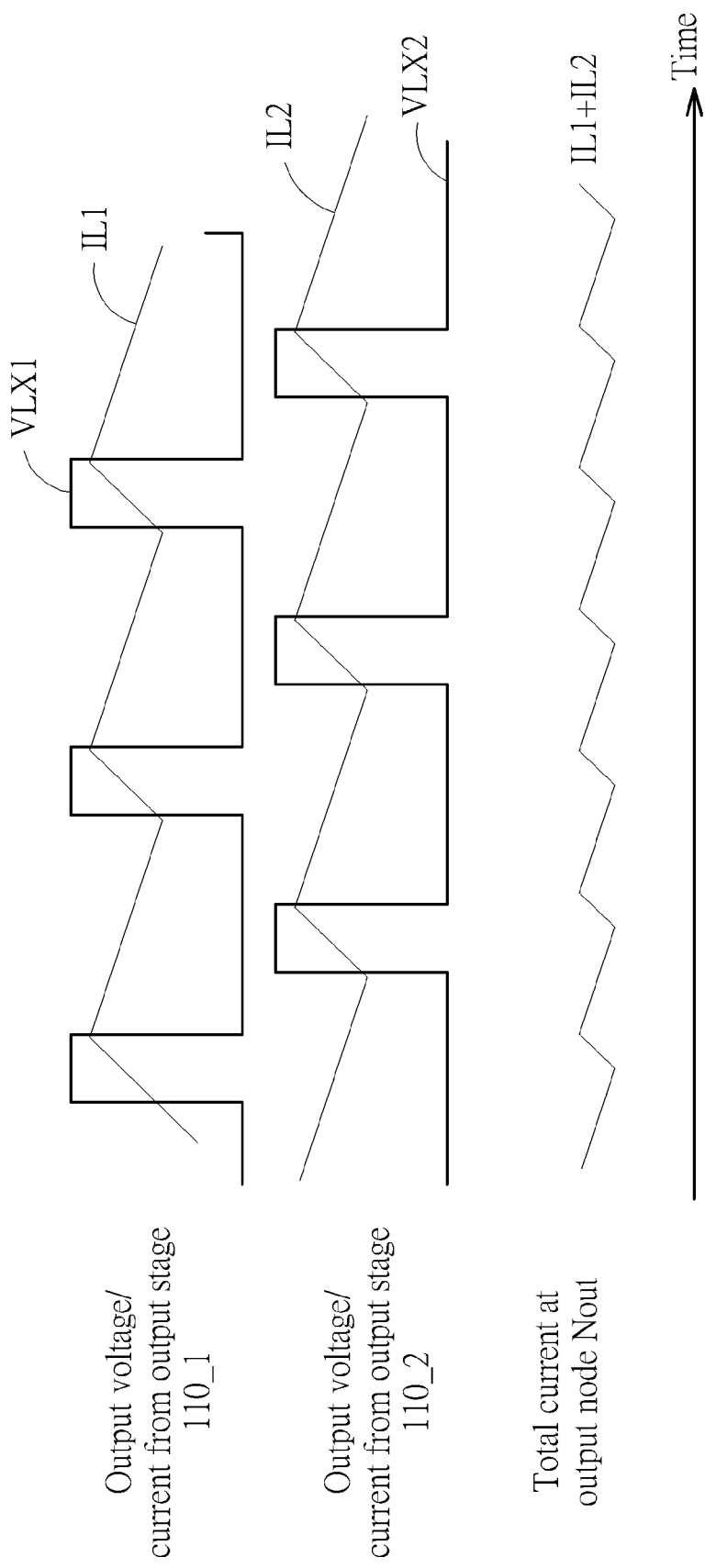
FIG. 2 shows a timing diagram of the output voltage VLX1, output voltage VLX2, output current IL1 and output current IL2 according to one embodiment of the present invention.

In this embodiment, the voltage regulator 100 is a multi-phase DC-DC regulator, that is the controller 120 may operate in a single phase mode or a dual phase mode according to sensed currents ICS1 and ICS2 of the output stages 110_1 and 110_2, where the sensed currents ICS1 and ICS2 may be substantially equal to the output currents IL1 and IL2, respectively, or the sensed currents ICS1 and ICS2 may have a predetermined relationship (e.g. predetermined ratio) to the output currents IL1 and IL2, respectively. When the controller 120 operates in the single phase mode, the controller 120 may generate control signals VC11, VC12, VC21 and VC22 to enable the output stage 110_1 to provide the output voltage VLX1 and the output current IL1, and to disable the output stage 110_2 to not provide the output to the output node Nout. When the controller 120 operates in the dual phase mode, the controller 120 may generate control signals VC11, VC12, VC21 and VC22 to enable both the output stages 110_1 and 110_2, where the output voltage VLX1 from the output stage 110_1 and the output voltage VLX2 from the output stage 110_2 have different phases. FIG. 2 shows a timing diagram of the output voltage VLX1, output voltage VLX2, output current IL1 and output current IL2 according to one embodiment of the present invention. As shown in FIG. 2, when the controller 120 operates in the dual phase mode, the output stages 110_1 and 110_2 outputs the output voltages VLX1 and VLX2 with same frequency and different phases.

Figure 3:
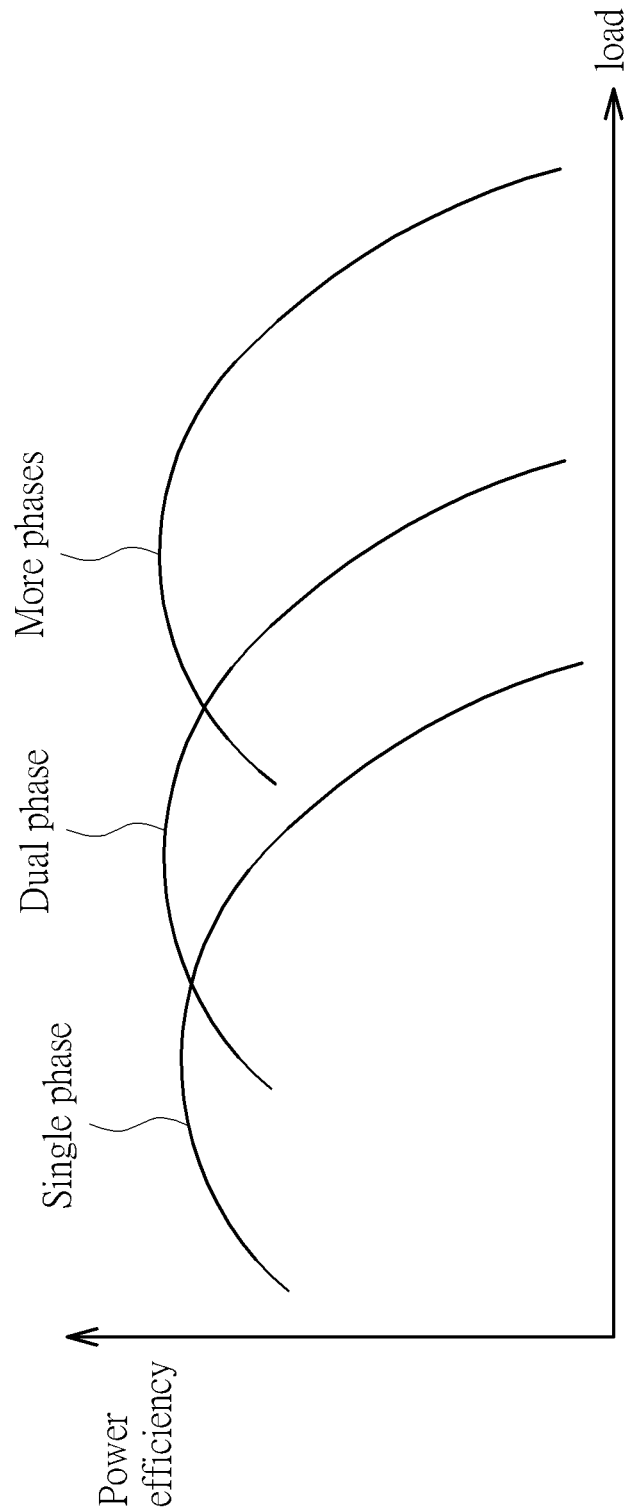
FIG. 3 shows a relationship between power efficiency and load when the voltage regulator operates in the single phase mode and the dual phase mode.

Please refer to FIG. 3, which shows a relationship between power efficiency and load when the voltage regulator 100 operates in the single phase mode and the dual phase mode. As shown in FIG. 3, when the load (i.e. load current IL1+IL2) varies, the voltage regulator 100 is required to change the mode to have the better power efficiency. For example, if the voltage regulator 100 operates in the dual phase mode and the load current decreases, the voltage regulator 100 may switch to the single phase mode to maintain the power efficiency. As described in the background, however, when the voltage regulator 100 switches from the dual phase mode to the single phase mode, because the output stage 110_2 is disabled, the output current IL1 form output stage 110_1 may have an overshoot issue, and the transient output current IL1 may be greater than the previous load current, causing that the voltage regulator 100 may misunderstand that load becomes heavy, thereby the voltage regulator 100 immediately switches back to the dual phase mode. To solve this problem, an embodiment shown in FIG. 4 is provided to design an adaptive hysteresis to prevent the voltage regulator 100 from toggling between the dual phase mode and the single phase mode.

Figure 4:
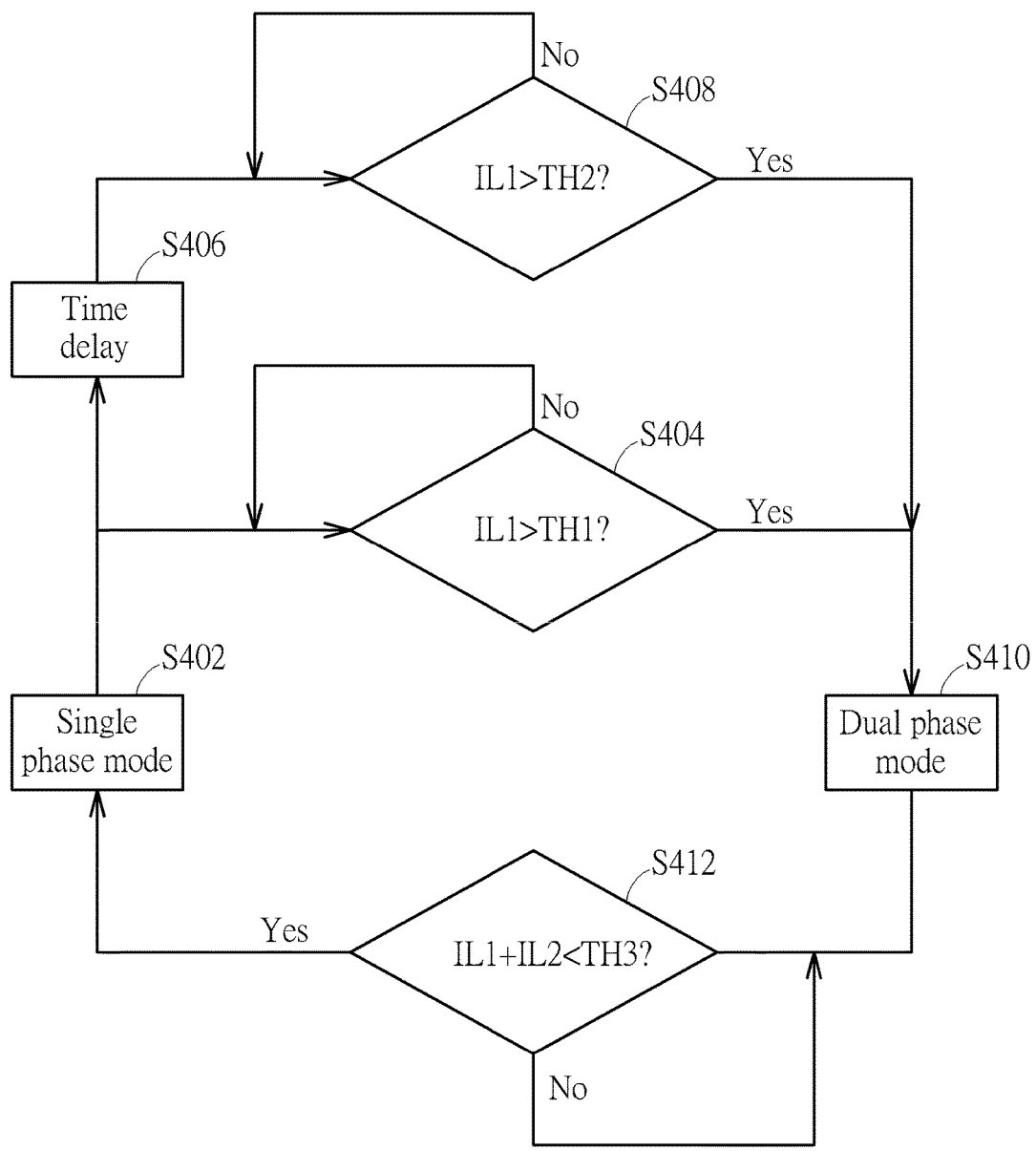
FIG. 4 is a flowchart of a method for controlling the output stages of the voltage regulator according to one embodiment of the present invention.
Figure 5:
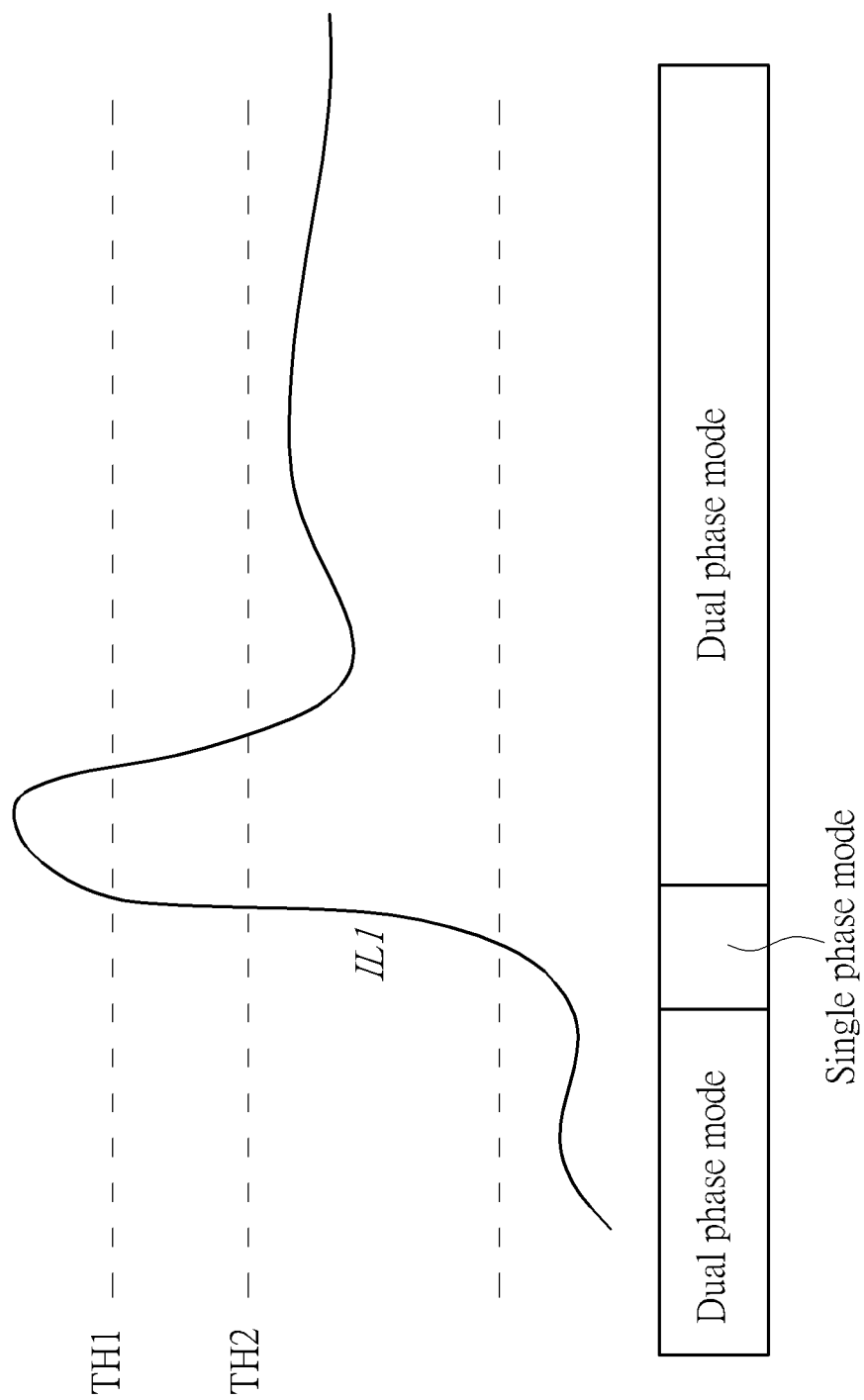
FIG. 5 shows the embodiment of a path comprising the Steps S402, S404 and S410 according to one embodiment of the present invention.

FIG. 4 is a flowchart of a method for controlling the output stages 110_1 and 110_2 of the voltage regulator 100 according to one embodiment of the present invention. In Step S402, the voltage regulator 100 operates from the dual phase mode to the single phase mode, that is the controller 120 generates the control signals VC11 and VC12 to the output stage 110_1 to generate the output voltage VLX1 and the output current IL1, and the controller 120 further generates the control signals VC21 and VC22 to disable the output stage 110_2. After switching to the single phase mode, in Step S404, the controller 120 immediately determines whether the output current IL1 is greater than a first threshold TH1 or not. If the output current IL1 is not greater than the first threshold TH1, the controller 120 temporarily keeps staying in the single phase mode; and if the output current IL1 is greater than the first threshold TH1, it is meant that the load may suddenly become very heavy, so flow enters Step S410 and the controller 120 switches back to the dual phase mode to enable both the output stages 110_1 and 110_2 to lower the output current IL1. FIG. 5 shows the embodiment of a path comprising the Steps S402, S404 and S410 according to one embodiment of the present invention.

Figure 6:
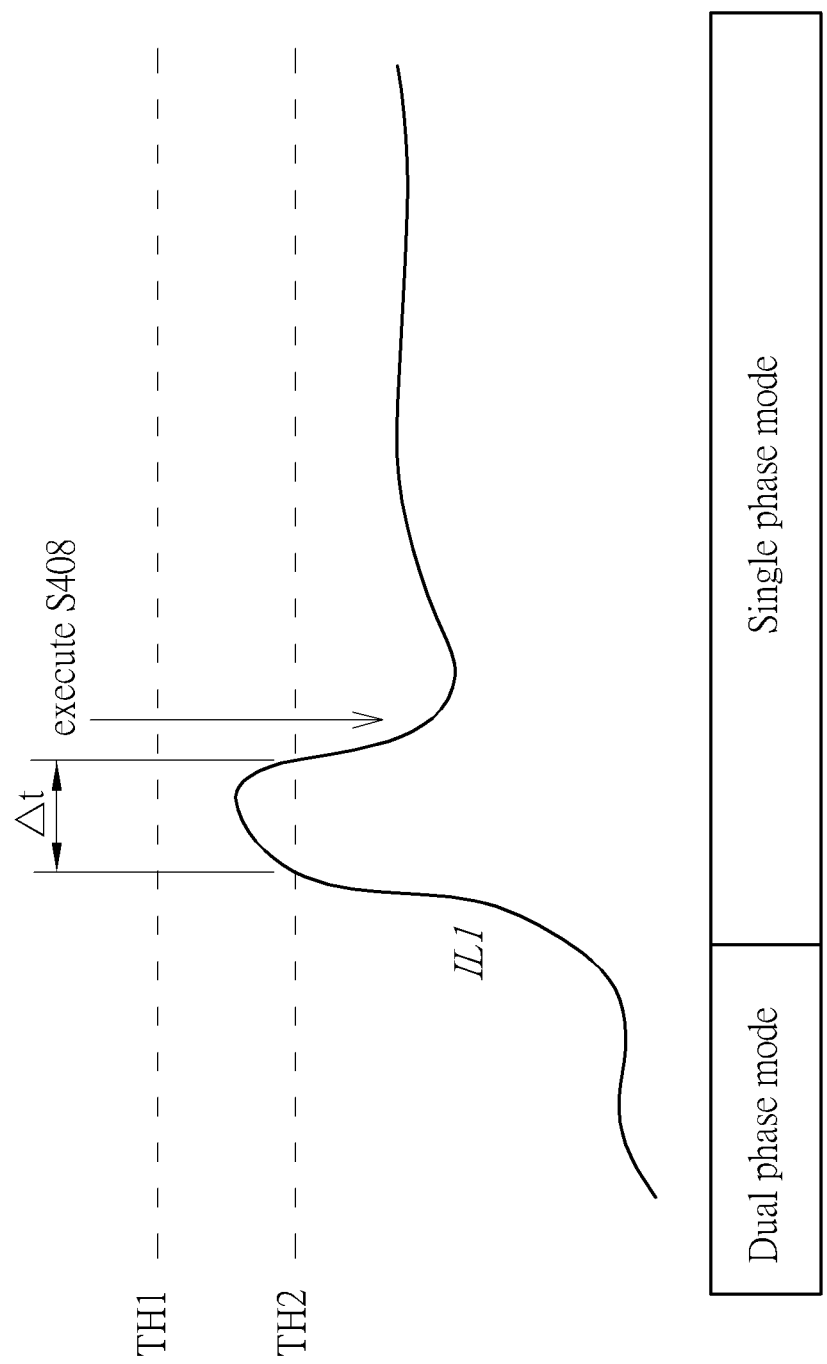
FIG. 6 shows the embodiment of a path comprising the Steps S402, S406, S408 and S410 according to one embodiment of the present invention.

After switching to the single phase mode, a period of time later (Step S406), in Step S408, the controller 120 further determines whether the output current IL1 is greater than a second threshold TH2 or not, where the second threshold TH2 is lower than the first threshold TH1. If the output current IL1 is not greater than the second threshold TH2, the controller 120 keeps staying in the single phase mode; and if the output current IL1 is greater than the second threshold TH2, it is meant that the load indeed become heavy, so flow enters Step 5410 and the controller 120 switches back to the dual phase mode to enable both the output stages 110_1 and 110_2 to lower the output current IL1. FIG. 6 shows the embodiment of a path comprising the Steps S402, S406, S408 and S410 according to one embodiment of the present invention, where the time delay amount of the Step S408 is greater than a overshoot period Δt shown in FIG. 6 to make the Step S408 can be executed when the output current IL1 is in a normal level.

In addition, when the voltage regulator 100 switches to the dual phase mode, in Step 412, the controller 120 continuously monitors a summation of the output signals IL1 and IL2, and determines whether the summation of the output signals IL1 and IL2 is lower than a third threshold TH3. If the summation of the output signals IL1 and IL2 is lower than the third threshold TH3, it is meant that the load becomes light, so the controller 120 disables the output stage 110_2 to make the voltage regulator 100 to operate in the single phase mode (S402); if the summation of the output signals IL1 and IL2 is not lower than the third threshold TH3, the voltage regulator 100 keeps staying in the dual phase mode.

In the embodiments shown in FIGS. 4-6, in Steps S404, S406 and S408, there are two hysteresis windows (two thresholds TH1 and TH2) to determine whether to switch-back to the dual phase mode. The first threshold TH1 having a higher level the is used in the Step S404 immediately executed after the voltage regulator 100 switches to the single phase mode, and the second threshold TH2 having a lower level is used in the Step S408 executed a period of time after the voltage regulator 100 switches to the single phase mode. By using this embodiment, the voltage regulator 100 can avoid the toggle between the dual phase mode and the single phase mode while maintaining the power efficiency and protecting the circuits.

For example, assuming that TH1=2.5 A, TH2=2.0 A and TH3=1.7 A, if the voltage regulator 100 operates in the dual phase mode and the both the output currents IL1 and IL2 drop to 0.8 A, the voltage regulator 100 will switch to the single phase mode because the summation of the output currents IL1 and IL2 is lower than the third threshold TH3 (0.8 A+0.8 A=1.6 A<1.7 A). After the output stage 110_2 is disabled, ideally the output current IL1 is equal to 1.6 A, however, actually the output current IL1 may be up to 2.2 A or higher due to the overshoot issue. By using the aforementioned embodiments, because the step S408 is executed after the overshoot period Δt shown in FIG. 6, the voltage regulator 100 will not switch back to the dual phase mode due to the overshoot issue, and the mode toggle can be avoided.

Figure 7:
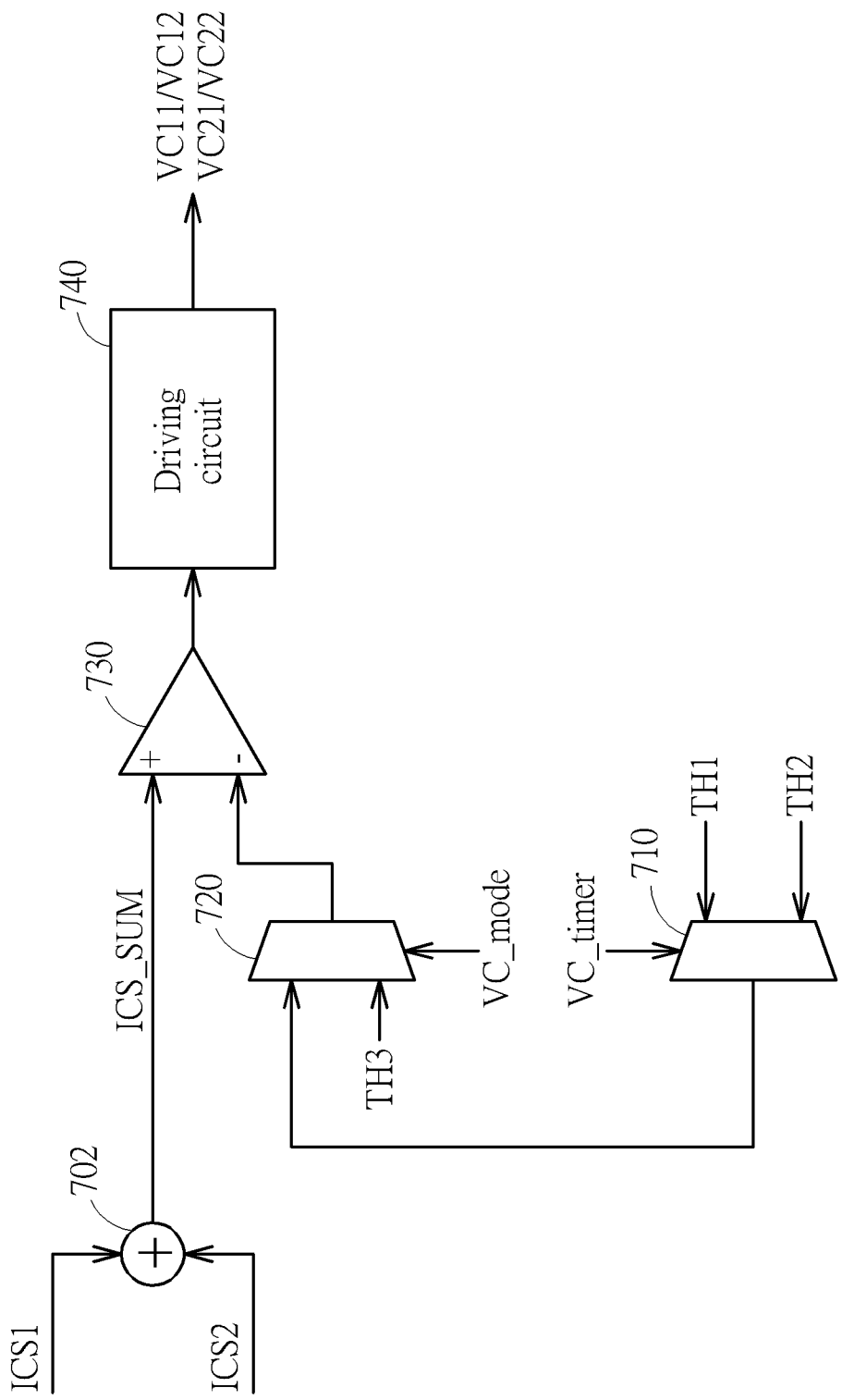
FIG. 7 is a diagram illustrating circuits within the controller according to one embodiment of the present invention.

FIG. 7 is a diagram illustrating circuits within the controller 120 according to one embodiment of the present invention. As shown in FIG. 7, the circuits comprise an adder, a multiplexer module including two multiplexers 710 and 720, a comparator 730 and a driving circuit 740. In the operations of the circuits shown in FIG. 7, the adder 702 is arranged to provide the summation of the sensed currents ICS1 and ICS2 (substantially equal to IL1 and IL2) to generate a summation result ICS_SUM; the comparator 730 is arranged to compare the summation result ICS_SUM with one of the thresholds TH1, TH2 and TH3 outputted from the multiplexer 720 to generate the a comparison result; and the driving circuit 740 is arranged to generate the control signals VC11, VC12, VC21 and VC22 to the output stages 110_1 and 11_2 according to the comparison result.

Regarding the operation of the multiplexers 710 and 720, the multiplexer 710 receives the first threshold TH1 and the second threshold TH2, and selectively outputs one of the first threshold TH1 and the second threshold TH2 according to a timing control signal VC_timer from a timer; and the multiplexer 710 receives the third threshold TH3 and an output of the multiplexer 710, and selectively outputs one of the third threshold TH3 and the output of the multiplexer 710 according to a mode control signal VC_mode. In detail, referring to FIG. 4 and FIG. 7 together, when the voltage regulator 100 switches into the single phase mode (S402), initially the timing control signal VC_timer controls the multiplexer 710 to output the first threshold TH1, and the mode control signal VC_mode controls the multiplexer 720 to output the first threshold TH1 to the comparator 730 for the operations of the Step S404; then a period of time later, the timing control signal VC_timer controls the multiplexer 710 to output the second threshold TH2, and the mode control signal VC_mode controls the multiplexer 720 to output the first threshold TH2 to the comparator 730 for the operations of the Step 5408. In addition, when the voltage regulator 100 operates the dual phase mode (S402), the mode control signal VC_mode controls the multiplexer 720 to output the third threshold TH3 to the comparator 730 for the operations of the Step S412.

It is noted that, the above-mentioned embodiments merely mention the switching between the single phase mode and the dual phase mode, however, a person skilled in the art should understand how to apply to the switching steps between the dual phase mode and the three or more phase mode after reading the above disclosure. For example, when the controller 120 requires to generate the control signals to reduce a quantity of the enabled output stages, the controller determines whether the summation of the sensed output currents is greater than a threshold or not to determine whether to enable more output stages, then a period of time later, the controller 120 selectively determines whether the summation of the sensed output currents is greater than another threshold having lower level or not to determine whether to enable more output stages Briefly summarized, in the voltage regulator of the present invention, two hysteresis windows are provided to prevent the voltage regulator from toggling between the dual phase mode and the single phase mode, therefore, the power efficiency can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A voltage regulator, comprising:
a plurality of output stages, for selectively enabling to generate output voltages and output currents or not according to a plurality of control signals, respectively; and
a controller, for sensing the output currents of the output stages, and generating the control signals to control the output stages, respectively, according to the sensed output currents;
wherein when the controller generates the control signals to reduce a quantity of the enabled output stages, the controller determines whether a summation of the sensed output currents is greater than a first threshold or not to determine whether to enable more output stages, then a period of time later, the controller selectively determines whether the summation of the sensed output currents is greater than a second threshold or not to determine whether to enable more output stages, wherein the second threshold is lower than the first threshold;
wherein when the summation of the sensed output currents is greater than the first threshold, the controller enables more output stages, and the controller does not further determine whether the summation of the sensed output currents is greater than the second threshold or not.

2. The voltage regulator of claim 1, wherein when the summation of the sensed output currents is not greater than the first threshold, the controller determines whether the summation of the sensed output currents is greater than the second threshold or not to determine whether to enable more output stages.

3. The voltage regulator of claim 1, wherein the controller comprises:
 a multiplexer module, for receiving the first threshold and the second threshold, and selectively outputs one of the first threshold and the second threshold;
 a comparator, for comparing the summation of the sensed output currents with an output of the multiplexer module to generate a comparison result; and
 a driving circuit, for generating the control signals to the output stages according to the comparison result.

4. The voltage regulator of claim 3, wherein the multiplexer module selectively outputs one of the first threshold and the second threshold according to a timing control signal from a timer.

5. The voltage regulator of claim 3, wherein the controller further determines whether the summation of the sensed output currents is less than a third threshold or not to determine whether to reduce the quantity of the enabled output stages, and the multiplexer module comprises:
 a first multiplexer, for receiving the first threshold and the second threshold, and selectively outputs one of the first threshold and the second threshold; and
 a second multiplexer, for receiving the third threshold and an output of the first multiplexer, and selectively outputting one of the third threshold and the output of the first multiplexer to the comparator.

6. The voltage regulator of claim 5, wherein the first multiplexer selectively outputs one of the first threshold and the second threshold according to a timing control signal from a timer, and the second multiplexer selectively outputs one of the third threshold and the output of the first multiplexer according to a mode control signal.

7. The voltage regulator of claim 1, wherein the voltage regulator is a DC-DC voltage regulator, and the output voltages and the output currents generated by different output stages have different phases.

8. A method for controlling a plurality of output stages of a voltage regulator, comprising:
 sensing output currents of the output stages;
 generating a plurality of control signals to selectively enable the output stages or not, respectively, according to the sensed output currents;
 when the output stages are controlled to reduce a quantity of the enabled output stages, determining whether a summation of the sensed output currents is greater than a first threshold or not to determine whether to enable more output stages; then a period of time later, selectively determining whether the summation of the sensed output currents is greater than a second threshold or not to determine whether to enable more output stages, wherein the second threshold is lower than the first threshold;
 wherein the step of determining whether the summation of the sensed output currents is greater than the first threshold or not to determine whether to enable more output stages, and selectively determining whether the summation of the sensed output currents is greater than the second threshold or not comprises:
  when the summation of the sensed output currents is greater than the first threshold, enabling more output stages, and not determining whether the summation of the sensed output currents is greater than the second threshold or not.

9. The method of claim 8, wherein the step of determining whether the summation of the sensed output currents is greater than the first threshold or not to determine whether to enable more output stages, and selectively determining whether the summation of the sensed output currents is greater than the second threshold or not comprises:
  when the summation of the sensed output currents is not greater than the first threshold, determining whether the summation of the sensed output currents is greater than the second threshold or not to determine whether to enable more output stages.

10. The method of claim 8, wherein the voltage regulator is a DC-DC voltage regulator, and the output currents generated by different output stages have different phases.

11. A voltage regulator, comprising:
 a first output stage, for selectively enabling to generate a first output voltage and a first output current with a first phase or not;
 a second output stage, for selectively enabling to generate a second output voltage and a second output current with a second phase or not; and
 a controller, for selectively operating in a single phase mode or a dual phase mode according to the first output current and the second output current, wherein when the controller operates in the single phase mode, the controller enables the first output stage and disable the second output stage; and when the controller operates in the dual phase mode, the controller enables the first output stage and the second output stage;
 wherein when the controller switches from the dual phase mode to the single phase mode, the controller determines whether the first output current is greater than a first threshold or not to determine whether to switch back to the dual phase mode, then a period of time later, the controller selectively determines whether the first output current is greater than a second threshold or not to determine whether to switch back to the dual phase mode, wherein the second threshold is lower than the first threshold;
 wherein when the first output current is greater than the first threshold, the controller switches to the dual phase mode, and the controller does not further determine whether the first output current is greater than the second threshold or not.

12. The voltage regulator of claim 11, wherein when a summation of the first and second output currents is not greater than the first threshold, the controller determines whether the summation of the first and second output currents is greater than the second threshold or not to determine whether to enable more output stages.

13. The voltage regulator of claim 11, wherein the controller comprises:
 a multiplexer module, for receiving the first threshold and the second threshold, and selectively outputs one of the first threshold and the second threshold;
 a comparator, for comparing the first output current with an output of the multiplexer module to generate a comparison result; and
 a driving circuit, for generating the control signals to the output stages according to the comparison result.

14. The voltage regulator of claim 13, wherein the multiplexer module selectively outputs one of the first threshold and the second threshold according to a timing control signal from a timer.

15. The voltage regulator of claim 13, wherein when the controller operates in the dual phase mode, the controller further determines whether the summation of the first output current and the second output current is less than a third threshold or not to determine whether to switch to the single phase mode, and the multiplexer module comprises:

a first multiplexer, for receiving the first threshold and the second threshold, and selectively outputs one of the first threshold and the second threshold; and a second multiplexer, for receiving the third threshold and an output of the first multiplexer, and selectively outputting one of the third threshold and the output of the first multiplexer to the comparator.

16. The voltage regulator of claim 15, wherein the first multiplexer selectively outputs one of the first threshold and the second threshold according to a timing control signal from a timer, and the second multiplexer selectively outputs one of the third threshold and the output of the first multiplexer according to a mode control signal.

17. The voltage regulator of claim 16, wherein when the mode control signal indicates that the controller operates in the dual phase mode, the second multiplexer outputs the third threshold to the comparator; and when the mode control signal indicates that the controller operates in the single phase mode, the second multiplexer outputs the output of the first multiplexer to the comparator.

18. A voltage regulator, comprising:

a plurality of output stages, for selectively enabling to generate output voltages and output currents or not according to a plurality of control signals, respectively; and a controller, for sensing the output currents of the output stages, and generating the control signals to control the output stages, respectively, according to the sensed output currents;

wherein when the controller generates the control signals to reduce a quantity of the enabled output stages, the controller determines whether a summation of the sensed output currents is greater than a first threshold or not to determine whether to enable more output stages, then a period of time later, the controller selectively determines whether the summation of the sensed output currents is greater than a second threshold or not to determine whether to enable more output stages, wherein the second threshold is lower than the first threshold;

wherein the controller comprises:

a multiplexer module, for receiving the first threshold and the second threshold, and selectively outputs one of the first threshold and the second threshold;

a comparator, for comparing the summation of the sensed output currents with an output of the multiplexer module to generate a comparison result; and a driving circuit, for generating the control signals to the output stages according to the comparison result.

19. The voltage regulator of claim 18, wherein when the summation of the sensed output currents is greater than the first threshold, the controller enables more output stages, and the controller does not further determine whether the summation of the sensed output currents is greater than the second threshold or not.

20. The voltage regulator of claim 18, wherein when the summation of the sensed output currents is not greater than the first threshold, the controller determines whether the summation of the sensed output currents is greater than the second threshold or not to determine whether to enable more output stages.

21. The voltage regulator of claim 18, wherein the multiplexer module selectively outputs one of the first threshold and the second threshold according to a timing control signal from a timer.

22. The voltage regulator of claim 18, wherein the controller further determines whether the summation of the sensed output currents is less than a third threshold or not to determine whether to reduce the quantity of the enabled output stages, and the multiplexer module comprises:

a first multiplexer, for receiving the first threshold and the second threshold, and selectively outputs one of the first threshold and the second threshold; and a second multiplexer, for receiving the third threshold and an output of the first multiplexer, and selectively outputting one of the third threshold and the output of the first multiplexer to the comparator.

23. The voltage regulator of claim 22, wherein the first multiplexer selectively outputs one of the first threshold and the second threshold according to a timing control signal from a timer, and the second multiplexer selectively outputs one of the third threshold and the output of the first multiplexer according to a mode control signal.

24. The voltage regulator of claim 18, wherein the voltage regulator is a DC-DC voltage regulator, and the output voltages and the output currents generated by different output stages have different phases.

25. A voltage regulator, comprising:

a first output stage, for selectively enabling to generate a first output voltage and a first output current with a first phase or not;

a second output stage, for selectively enabling to generate a second output voltage and a second output current with a second phase or not; and a controller, for selectively operating in a single phase mode or a dual phase mode according to the first output current and the second output current, wherein when the controller operates in the single phase mode, the controller enables the first output stage and disable the second output stage; and when the controller operates in the dual phase mode, the controller enables the first output stage and the second output stage;

wherein when the controller switches from the dual phase mode to the single phase mode, the controller determines whether the first output current is greater than a first threshold or not to determine whether to switch back to the dual phase mode, then a period of time later, the controller selectively determines whether the first output current is greater than a second threshold or not to determine whether to switch back to the dual phase mode, wherein the second threshold is lower than the first threshold;

wherein the controller comprises:

a multiplexer module, for receiving the first threshold and the second threshold, and selectively outputs one of the first threshold and the second threshold;

a comparator, for comparing the first output current with an output of the multiplexer module to generate a comparison result; and a driving circuit, for generating the control signals to the output stages according to the comparison result.

26. The voltage regulator of claim 25, wherein when the first output current is greater than the first threshold, the controller switches to the dual phase mode, and the controller does not further determine whether the first output current is greater than the second threshold or not.

27. The voltage regulator of claim 25, wherein when a summation of the first and second output currents is not greater than the first threshold, the controller determines whether the summation of the first and second output currents is greater than the second threshold or not to determine whether to enable more output stages.

28. The voltage regulator of claim 25, wherein the multiplexer module selectively outputs one of the first threshold and the second threshold according to a timing control signal from a timer.

29. The voltage regulator of claim 25, wherein when the controller operates in the dual phase mode, the controller further determines whether the summation of the first output current and the second output current is less than a third threshold or not to determine whether to switch to the single phase mode, and the multiplexer module comprises:
- a first multiplexer, for receiving the first threshold and the second threshold, and selectively outputs one of the first threshold and the second threshold; and
- a second multiplexer, for receiving the third threshold and an output of the first multiplexer, and selectively outputting one of the third threshold and the output of the first multiplexer to the comparator.

30. The voltage regulator of claim 29, wherein the first multiplexer selectively outputs one of the first threshold and the second threshold according to a timing control signal from a timer, and the second multiplexer selectively outputs one of the third threshold and the output of the first multiplexer according to a mode control signal.

31. The voltage regulator of claim 30, wherein when the mode control signal indicates that the controller operates in the dual phase mode, the second multiplexer outputs the third threshold to the comparator; and when the mode control signal indicates that the controller operates in the single phase mode, the second multiplexer outputs the output of the first multiplexer to the comparator.

* * * * *